US012707216B2

(12) United States Patent
Lee et al.

(10) Patent No.: US 12,707,216 B2
(45) Date of Patent: Aug. 11, 2026

(54) DIAPHRAGM, SOUND GENERATION DEVICE, AND METHOD FOR MANUFACTURING SOUND GENERATION DEVICE

(71) Applicant: LG ELECTRONICS INC., Seoul (KR)

(72) Inventors: Sungdan Lee, Seoul (KR); Keunyoung Lee, Seoul (KR); Duho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 261 days.

(21) Appl. No.: 18/290,427

(22) PCT Filed: May 13, 2021

(86) PCT No.: PCT/KR2021/006016
§ 371 (c)(1),
(2) Date: Nov. 13, 2023

(87) PCT Pub. No.: WO2022/239889
PCT Pub. Date: Nov. 17, 2022

(65) Prior Publication Data
US 2024/0251214 A1 Jul. 25, 2024

(51) Int. Cl.
*H04R 31/00* (2006.01)
*H04R 7/12* (2006.01)

(52) U.S. Cl.
CPC .......... *H04R 31/003* (2013.01); *H04R 7/127* (2013.01); *H04R 2231/001* (2013.01); *H04R 2307/021* (2013.01); *H04R 2307/023* (2013.01); *H04R 2307/025* (2013.01)

(58) Field of Classification Search
CPC .................. H04R 31/003; H04R 7/127; H04R 2231/001; H04R 2307/021; H04R 2307/023; H04R 2307/025
See application file for complete search history.

(56) References Cited

U.S. PATENT DOCUMENTS

| | | | | |
|---|---|---|---|---|
| 2012/0100334 A1* | 4/2012 | Adams | .................... B32B 27/40 428/109 |
| 2014/0270271 A1 | 9/2014 | Dehe et al. | |

FOREIGN PATENT DOCUMENTS

| | | | |
|---|---|---|---|
| CN | 105393558 | 3/2016 | |
| CN | 109024067 | 12/2018 | |
| GB | 2530787 | 4/2016 | |
| GB | 2530787 A * | 4/2016 | ........... H04R 31/003 |
| JP | 6500236 | 4/2019 | |
| KR | 10-2012-0064984 | 6/2012 | |

(Continued)

OTHER PUBLICATIONS

European Patent Office Application Serial No. 21942037.9, Search Report dated Mar. 11, 2025, 9 pages.

(Continued)

*Primary Examiner* — Sunita Joshi
(74) *Attorney, Agent, or Firm* — LEE, HONG, DEGERMAN, KANG & WAIMEY

(57) ABSTRACT

Embodiments relate to a diaphragm having high rigidity and high internal loss. The diaphragm may comprise: a matrix-shaped structure including a plurality of through-holes; and a graphene layer disposed in at least a part of the plurality of through-holes and coupled to the structure.

15 Claims, 5 Drawing Sheets

(56) References Cited

FOREIGN PATENT DOCUMENTS

| | | | | | |
|---|---|---|---|---|---|
| KR | 20130036432 A | * | 4/2013 | ........... | H04R 31/003 |
| KR | 10-2016-0070638 | | 6/2016 | | |
| KR | 10-2017-0096099 | | 8/2017 | | |
| KR | 10-2110203 | | 5/2020 | | |
| WO | 2018023842 | | 2/2018 | | |

OTHER PUBLICATIONS

PCT International Application No. PCT/KR2021/006016, International Search Report dated Feb. 10, 2022, 16 pages.

The State Intellectual Property Office of the People's Republic of China Application Serial No. 202180098166.X, Office Action dated Apr. 3, 2026, 9 pages.

* cited by examiner

DIAPHRAGM, SOUND GENERATION DEVICE, AND METHOD FOR MANUFACTURING SOUND GENERATION DEVICE

CROSS-REFERENCE TO RELATED APPLICATIONS

This application is the National Stage filing under 35 U.S.C. 371 of International Application No. PCT/KR2021/006016, filed on May 13, 2021, the contents of which are hereby incorporated by reference herein its entirety.

TECHNICAL FIELD

Embodiments are applicable to a technological field related to a diaphragm or a sound generating device including the diaphragm, and for example, rerates to a diaphragm and a sound generating device including graphene, and a method of manufacturing a sound generating device.

BACKGROUND

A sound generating device is a device that receives an electrical signal and converts the electrical signal into an audio signal and is used as speakers or through earphones in various electronic devices such as video equipment, laptop computers, tablet PCs, and mobile phones.

This sound generating device has a diaphragm to transmit a voice signal. At this time, the diaphragm is required to have a property for reproducing sound quality with a flat frequency in a wide reproduction band.

Graphene is a two-dimensional thin film made via planar bonds of carbon atoms, and has various advantages such as high electron mobility and excellent mechanical strength, and has recently been used in sound generating devices.

However, when a diaphragm is manufactured using graphene, there is a problem in that it is difficult to mold the graphene into a shape of the diaphragm due to low ductility thereof.

DETAILED DESCRIPTION

Technical Solution

A diaphragm needs to be made of a material that have a high Young's modulus and low density to determine a reproduction band of a low or high sound and also have a high internal loss to improve response characteristics with a flat frequency.

There is a need for a diaphragm with improved ductility and improved moldability and a sound generating device having the diaphragm.

Technical Solution

According to embodiments, a diaphragm includes a structure including a first material and having a matrix shape including a plurality of through holes or a plurality of non-through holes, and a graphene layer disposed on at least a portion of the plurality of through holes or the plurality of non-through holes and combined with the structure.

In this case, the diaphragm according to embodiments may further include a binder combining the structure and the graphene layer and including a second material.

In this case, the second material according to embodiments may be the same as the first material.

In this case, the binder according to embodiments may have a content of 5 wt % to 20 wt % in the graphene layer.

In this case, the diaphragm according to embodiments may further include a coating layer formed on at least one surface of the structure and configured to protect the diaphragm.

In this case, the graphene layer according to embodiments may include a plurality of graphene layers which are stacked.

In this case, the diaphragm according to embodiments may include a dome portion disposed on a central portion of the diaphragm and an edge portion forming an edge of the dome portion, and the dome portion and the edge portion may include the structure and the graphene layer.

In this case, the first material according to embodiments may be at least one of graphene, cellulose, nacre, bone, dention, polyacryl acid (PAA), polycyclic aromatic hydrocarbon (PAH), glutaraldehyde (GA), borate, polyvinyl alcohol (PVA), or PCDO.

In this case, the second material according to embodiments may be at least one of cellulose, nacre, bone, dention, PAA, PAH, GA, Borate, PVA, or PCDO.

In this case, the coating layer according to embodiments may be at least one polymer compound including cellulose and PVA.

A sound generating device according to embodiments includes a vibrating portion, and a driver configured to support the vibrating portion and drive the vibrating portion to vibrate according to an input current, wherein the vibrating portion includes a structure having a matrix shape including a plurality of through holes or a plurality of non-through holes, and a graphene layer disposed on at least a portion of the plurality of through holes or the plurality of non-through holes and combined with the structure.

A method of manufacturing a sound generating device according to embodiments includes forming a structure including a first material in a first solution including graphene particles and having a net structure, forming a graphene film by combining the graphene particle and the structure, and compressing the graphene film using a mold having a shape.

In this case, the first solution may further include a binder including a second material that is the same or different from the first material.

In this case, the method may further include applying and coating the first solution to the mold.

In this case, the binder according to embodiments may be formed to have a content of 5 wt % to 20 wt % in the graphene film.

Advantageous Effects

A diaphragm and a sound generating device including the diaphragm according to embodiments may have a high Young's modulus and low density, and thus a reproduction band may be extended to low or high sounds.

A diaphragm and a sound generating device including the diaphragm according to embodiments may have a high internal loss to improve response characteristics with a flat frequency.

A diaphragm and a sound generating device including the diaphragm according to embodiments may have improved ductility to have excellent moldability.

A diaphragm and a sound generating device including the diaphragm according to embodiments may have desired characteristics depending on an added material or substance.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

BEST MODE

Figure 1:
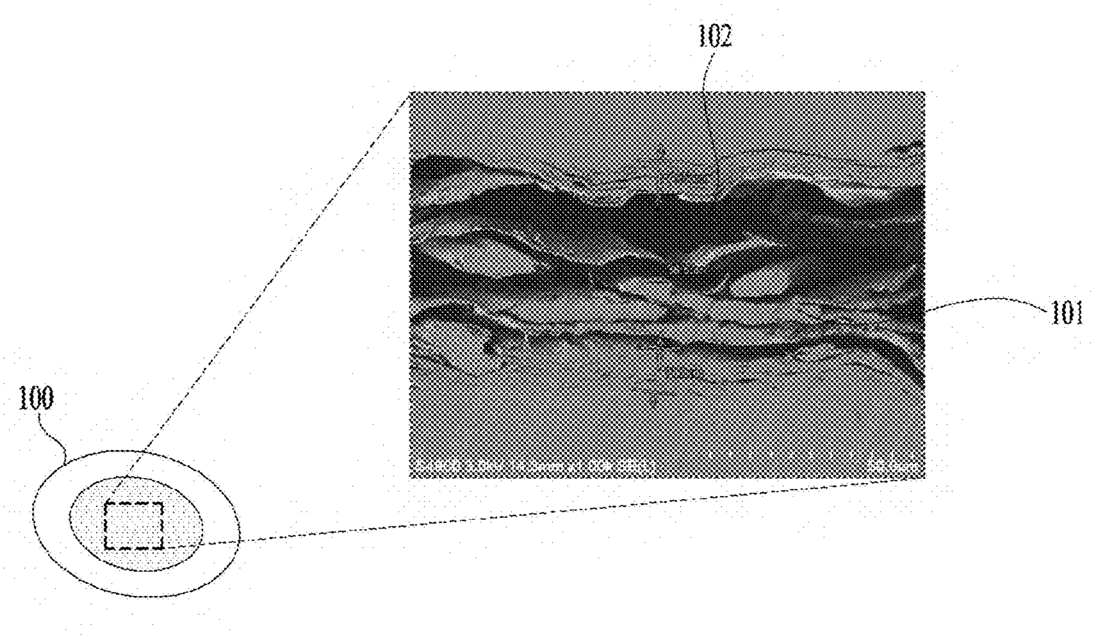
FIG. 1 is an enlarged view of a diaphragm according to embodiments.

Reference will now be made in detail to embodiments of the present disclosure, examples of which are illustrated in the accompanying drawings. Wherever possible, the same reference numbers will be used throughout the drawings to refer to the same or like parts, and a redundant description will be avoided. The terms "module" and "unit" are interchangeably used only for easiness of description and thus they should not be considered as having distinctive meanings or roles. Further, a detailed description of well-known technology will not be given in describing embodiments of the present disclosure lest it should obscure the subject matter of the embodiments. The attached drawings are provided to help the understanding of the embodiments of the present disclosure, not limiting the scope of the present disclosure. It is to be understood that the present disclosure covers various modifications, equivalents, and/or alternatives falling within the scope and spirit of the present disclosure.

The following embodiments of the present disclosure are intended to embody the present disclosure, not limiting the scope of the present disclosure. What could easily be derived from the detailed description of the present disclosure and the embodiments by a person skilled in the art is interpreted as falling within the scope of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Details for implementing the present disclosure will be described, examples of which are shown in the attached drawings. The details below with reference to the attached drawings are intended to explain the details rather than only showing embodiments to be implemented according to the embodiments. Hereinafter, the present disclosure is described in detail to provide a thorough understanding. However, it will be obvious to a person skilled in the art that the disclosure is practiced without these details. Most of the terms used in the present disclosure are selected from common ones widely used in the field, but some terms are arbitrarily selected by the applicant and their meaning is detailed in the following description as necessary. Therefore, the present disclosure needs to be understood based on the intended meaning of the term, not the mere name or meaning of the term. In addition, the drawings and details below do not need to be construed as being limited to the specifically described embodiments, but need to be construed as including even equivalents and substitutes of the embodiments described in the drawings and details.

In addition, when an element such as a layer, region or module is described as being "on" another element, it is to be understood that the element may be directly on the other element or there may be an intermediate element between them.

A sound generating device explained through embodiments is a concept that includes any device for generating a sound signal. The sound generating devices according to the embodiments may include, but are not limited to, wired earphones, wireless earphones, headphones, and speakers, and may include any device for changing an electrical or magnetic signal into an acoustic signal. In addition, a person skilled in the art will easily understand that the sound generating device according to the embodiments is applied to a device in which a diaphragm according to the embodiments is to be installed, even if the sound generating device is a new product to be developed in the future.

FIG. 1 is an enlarged view of a diaphragm according to embodiments.

A diaphragm 100 according to embodiments may include a structure 101 and a void 102.

The diaphragm 100 according to embodiments may generate sound, which is an acoustic signal, in response to vibration.

The structure 101 according to embodiments may be made of a polymer-based material such as cellulose or polyester, or a metal-based material such as aluminum (Al).

The structure 101 may include the plurality of voids 102. The voids 102 may be distributed over a wide range within the structure 101.

The diaphragm 100 according to embodiments may have a low Young's modulus due to the plurality of voids 102 distributed in the structure 101. Thus, the diaphragm 100 has a problem of not having a wide reproduction band due to a low Young's modulus. In addition, the diaphragm 100 may have a low internal loss due to s high density thereof, and thus there is a problem of non-flat frequency.

The diaphragm 100 according to embodiments may use graphene as the structure 101 to expand a reproduction band.

However, when the structure 101 is made using graphene, there is a problem that cracks occur during a process of forming a shape of the diaphragm 100 due to low ductility.

Figure 2:
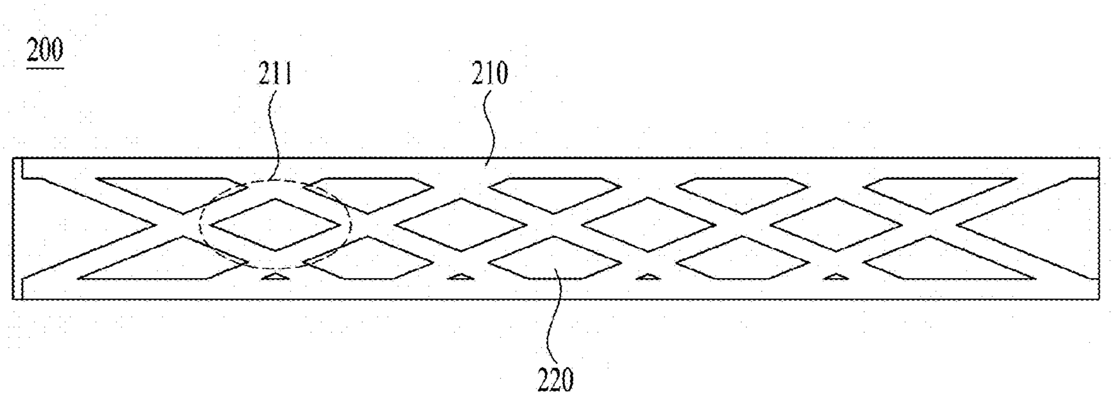
FIG. 2 is a schematic cross-sectional view of a diaphragm according to embodiments.

To resolve this problem, the diaphragm 100, which includes graphene and has a high Young's modulus and high internal loss, will be described in detail below:

FIG. 2 is a schematic cross-sectional view of a diaphragm according to embodiments.

A diaphragm 200 according to embodiments (e.g., the diaphragm described in FIG. 1) may include a structure 210 (the structure described in FIG. 1) and a graphene layer 220. In detail, the diaphragm 200 according to embodiments may include the structure 210 having a matrix shape and the graphene layer 220 combined with the structure 210.

The structure 210 according to embodiments may have a matrix shape. The structure 210 may have a net structure. In other words, the structure 210 may be formed such that a portion of the structure 210 has a sparse form. That is, the structure 210 may have one or more through holes 211 (e.g., which may include the void described in FIG. 1).

However, the present disclosure is not limited thereto, and although not shown, the structure 210 according to embodiments may have one or more non-through holes along with one or more through holes instead of one or more through holes.

The structure 210 according to embodiments may be formed as a single lump having a matrix shape. However, the present disclosure is not limited thereto, and the structure 210 may be formed of a plurality of lump groups.

The graphene layer 220 according to embodiments may be formed in one or more through holes 211 of the structure 210. That is, the graphene layer 220 may be formed in the sparse portion of the structure 210. The graphene layer 220 may be formed in one or more non-through holes of the structure 210. The graphene layer 220 may be formed outside the structure 210.

That is, the graphene layer 220 may be formed inside or outside the structure 210.

According to embodiments, the structure 210 and the graphene layer 220 may be combined with each other. The structure 210 and the graphene layer 220 may be combined in a mixed state. In other words, the structure 210 and the graphene layer 220 may be formed in a mixed state without forming a layer with each other. That is, the structure 210 and the graphene layer 220 may be combined by being impregnated within the structure 210 such that the structure 210 and the graphene layer 220 are not separated from each other.

Therefore, the diaphragm 200 according to embodiments may be formed by combining the structure 210 that has a net structure to form through holes 211 and the graphene layer 220 that are located in the through holes 211 of the structure 210 to fill all or part of the through holes 211.

At this time, the graphene layer 220 may be formed by filling all or part of one through hole 211 or by filling some through holes 211 and not filling some through holes 211 for the plurality of through holes 211.

The graphene layer 220 may be formed by filling all of the through holes 211 formed in the structure 210.

That is, the diaphragm 200 according to embodiments may have a structure in which the graphene layer 220 is formed in all or part of the through holes 21 included in the structure 210 or the structure 210 without the through holes 211 (e.g., a structure having a non-through hole) is formed between the graphene layers 210.

The diaphragm 200 according to embodiments may have the graphene layer 220 that fills the structure 210 in a matrix shape and is combined therewith, thereby improving ductility. Accordingly, the moldability of the diaphragm 200 may be improved.

The structure 210 according to embodiments may have at least one of polymer-based materials such as cellulose or polyester, for example, graphene, nacre, bone, dention, polyacryl acid (PAA), polycyclic aromatic hydrocarbon (PAH), glutaraldehyde (GA), borate, polyvinyl alcohol (PVA), and PCDO.

The graphene layer 220 according to embodiments may contain graphene. Graphene has high strength, an excellent Young's modulus, excellent electrical and thermal conductivity, and high flexibility. Therefore, the graphene layer 220 may have high strength.

The graphene layer 220 according to embodiments may contain 1 to 100 wt % of graphene. The graphene layer 220 may have a plurality of graphene layers. That is, the graphene layer 220 may have a form in which a plurality of graphene layers is layered. However, the present disclosure is not limited thereto, and the graphene layer 220 may have a single graphene layer.

The diaphragm 200 according to embodiments may include the graphene layer 220 formed as a plurality of graphene layers to have a high Young's modulus and low density. In other words, the diaphragm 200 may have high strength. Therefore, the diaphragm 200 may have a reproduction band extended to low and high sounds due to the high strength thereof.

Figure 3:
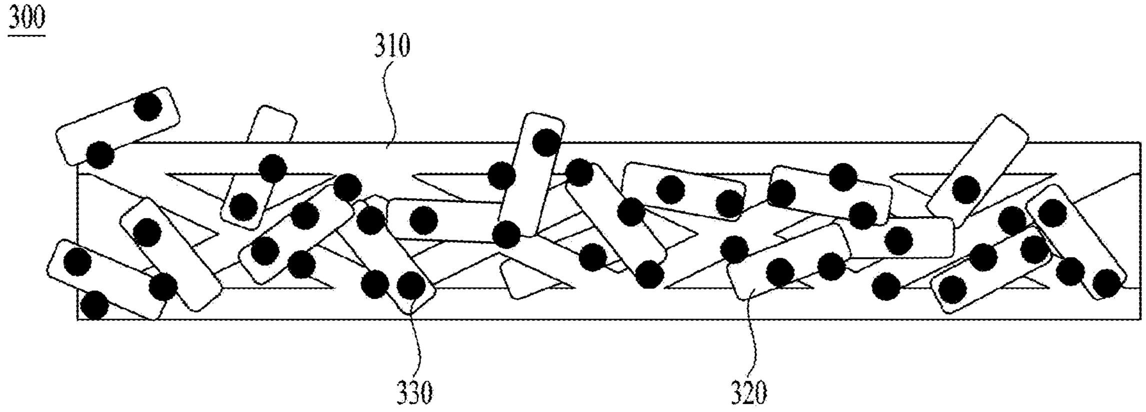
FIG. 3 is a schematic cross-sectional view of a diaphragm according to embodiments.

FIG. 3 is a schematic cross-sectional view of a diaphragm according to embodiments.

A diaphragm 300 according to embodiments (e.g., the diaphragm described in FIGS. 1 and 2) may include a structure 310 (e.g., the structure described in FIGS. 1 and 2), graphene layers 320 combined with the structure 310 (e.g., the graphene layer described in FIG. 2), and binders 330) combined with the structure 310 and the graphene layers 320.

The binder 330 according to embodiments may be formed by being combined with at least one of the structure 310 or the graphene layers 320. Accordingly, the binder 330 may further improve a combining degree of the structure 310 and the graphene layers 320. The binder 330 may improve the physical properties of the diaphragm 300.

The diaphragm 300 according to embodiments may have a higher Young's modulus and a lower density by including the binders 330. In other words, the diaphragm 300 may have properties of high strength and high internal loss through the binders 330. Therefore, the diaphragm 300 may have improved flat frequency response characteristics and an extended reproduction band through the binders 330.

The binder 330 according to embodiments may have a content of 5 to 30 wt % within the diaphragm 300. The binder 330 may have a content of 5 to 20 wt % within the diaphragm 300. In addition, the binder 330 may have a content of 10 wt % within the diaphragm 300.

The binder 330 according to embodiments may be formed of the same material as the structure 310. In addition, the structure 310 may function as the binder 330. However, the present disclosure is not limited thereto, and the structure 310 and the binder 330 may each be formed of the same material.

The binder 330 may be formed of a different material from the structure 310.

The binder 330 according to embodiments may include at least one of polymer compounds including cellulose and polyvinyl alcohol (PVA), for example, nacre, bone, dention, PAA, PAH, GA, Borate, and PCDO.

The diaphragm 300 according to embodiments may have different physical properties depending on the type of the binder 330 added. For example, the diaphragm 300 may improve a Young's modulus by adding cellulose or PVA as a binder to improve the bonding strength of graphene.

Accordingly, to obtain the diaphragm 300 with desired properties, the binder 330 of the desired material or type may be added.

FIG. 3 schematically shows the diaphragm 300 according to embodiments, and the diaphragm 300 according to embodiments is not limited to a shape shown in FIG. 3.

Therefore, the structure 310 is not limited to the shape of FIG. 3, and may have any shape including a sparse shape or a matrix shape.

The graphene layer 320 are not limited to the shape, direction, and location of FIG. 3, and may have any shape and direction as long as the graphene layer 320 fills an empty space located within the structure 310.

The graphene layers 320 may all be laid flat or positioned upright in the same direction, for example, some of the graphene layers 320 may be positioned at an angle with respect to a plane direction of the diaphragm 300, some of the graphene layers 320 may be positioned vertically, and some of the graphene layers 320 may be laid horizontally. Although not shown in FIG. 3, the graphene layers 320 may include a plurality of graphene layers or may include a single graphene layer. In addition, as shown in FIG. 3, the graphene layer 320 may include a plurality of separated graphene layers 320, or unlike shown in FIG. 3, may include the graphene layers 320 having a single non-separated lump.

The binder 320 is shown to have a circular shape, but is not limited thereto, and may have any shape to be combined with at least one of the structure 310 and the graphene layer 320.

Figure 4:
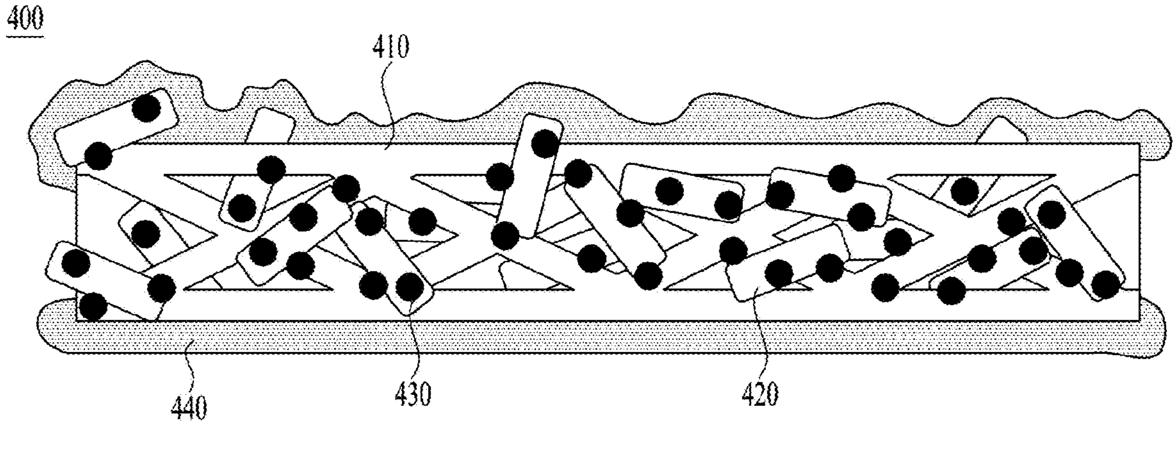
FIG. 4 is a schematic cross-sectional view of a diaphragm according to embodiments.

FIG. 4 is a schematic cross-sectional view of a diaphragm according to embodiments.

A diaphragm 400 according to embodiments (e.g., the diaphragm described in FIGS. 1 to 3) may include a structure 410 (e.g., the structure described in FIGS. 1 to 3), graphene layers 420 combined with the structure 410 (e.g., the graphene layer described in FIGS. 2 to 3), and a coating layer 440 formed on at least one surface of the structure 210. The diaphragm 400 may further include binders 430 combined with the structure 410 and the graphene layers 420 (e.g., the binders described in FIG. 3).

The coating layer 440 according to embodiments may be formed on at least one surface of the structure 410 and the graphene layers 420 to cover at least a portion of the structure 410 and the graphene layers 420. The coating layer 440 may protect the diaphragm 400 including the structure 410 and the graphene layers 420 from internal and external shocks.

Although FIG. 4 illustrates the case in which the coating layer 440 covers an entire surface of the structure 410 and the graphene layers 420, but is not limited thereto, and the coating layer 440 covers at least a portion of at least one of the structure 410 and the graphene layers 420.

The coating layer 440 according to embodiments include a polymer material, for example, poly(3,4-ethylenedioxy thiophene) (PEDOT), thiophene-based polymer, polypyrrole, polyaniline, polyvinylidene fluoride (PVDF), PbZrx-Til-xO3 (PZT) ((<x<1), polyethylene terephthalate (PET), polyetherimide (PEI), polyethylene naphthalate (PEN), and polyether ether ketone (PEEK), but is not limited thereto. The coating layer 440 may be formed using a solvent used in a manufacturing process of the diaphragm 400. Details thereof are described in FIG. 9.

Figure 5:
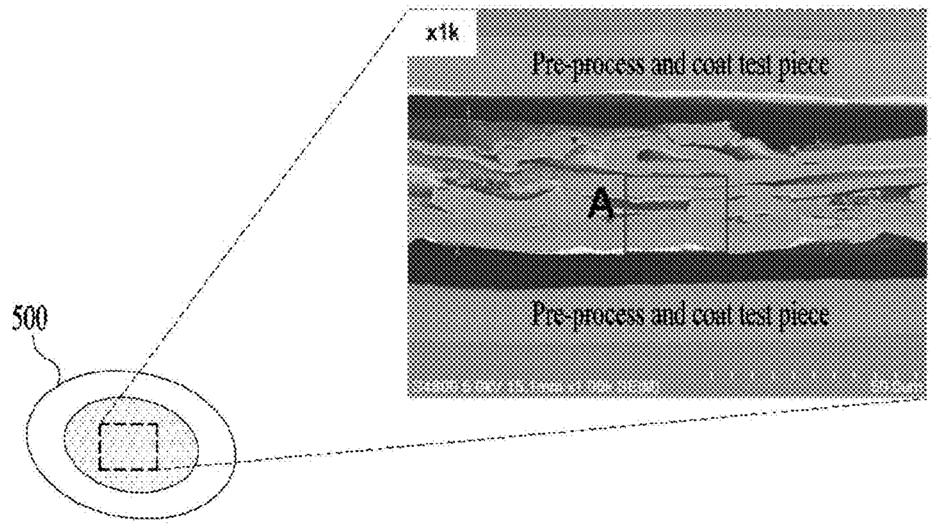
FIG. 5 is an enlarged cross-sectional view of a diaphragm according to embodiments.

FIG. 5 is an enlarged cross-sectional view of a diaphragm according to embodiments.

A diaphragm 500 according to embodiment (e.g., the diaphragm described in FIGS. 1 to 4) may include a structure (e.g., the structure described in FIGS. 1 to 4) and a graphene layer combined with the structure (e.g., the graphene layer described in FIGS. 2 to 4). The diaphragm 500 may further include binders combined with at least a portion of the structure and the graphene layer (e.g., the binder described in FIGS. 3 to 4). The diaphragm 500 may further include a coating layer formed to cover at least one surface of at least one of the structure, the graphene layer, and the binder (e.g., the coating layer described in FIG. 4).

As shown in FIG. 5, the diaphragm 500 according to embodiments may be formed with almost no voids. In other words, the diaphragm 500 may not have a void or through hole due to the graphene layer filling the void or through hole of the structure having a net structure or matrix shape (e.g., the void described in FIG. 1 or the through hole described in FIG. 2). At this time, the graphene layer may be formed in all the voids formed in the structure and fill all the voids, or may be formed in some of the voids formed in the structure and fill some of the voids.

Accordingly, the diaphragm 500 according to embodiments may have high strength properties with a high Young's modulus and low density. The diaphragm 500 may have a high internal loss. The diaphragm 500 may have a wider reproduction band and improved flat frequency response characteristics.

Figure 6:
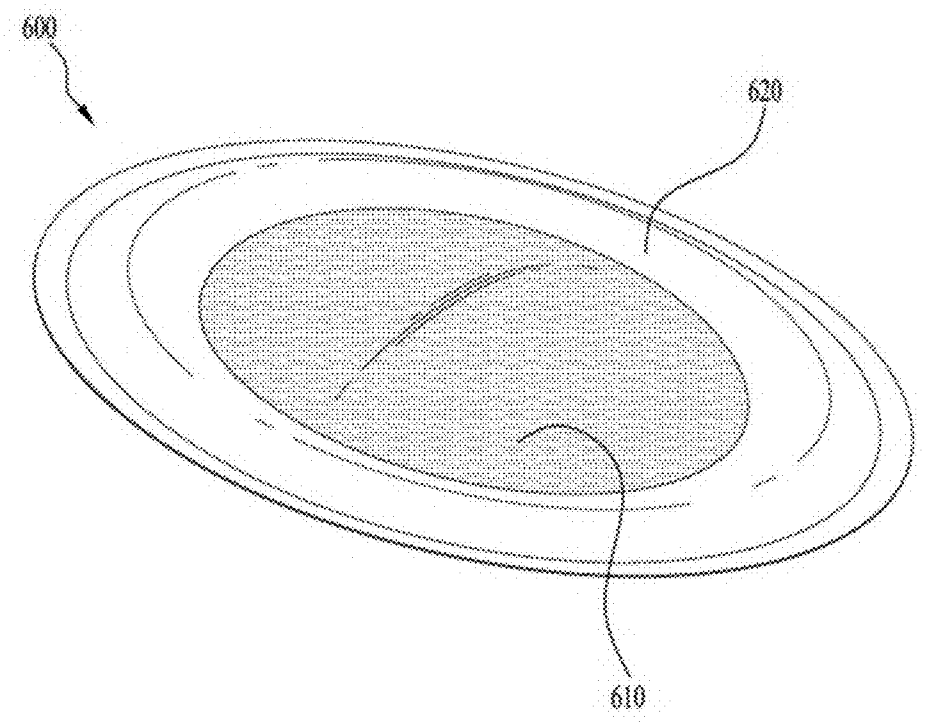
FIG. 6 schematically shows a diaphragm according to embodiments

FIG. 6 schematically shows a diaphragm according to embodiments.

A diaphragm 600 according to embodiments (e.g., the diaphragm described in FIGS. 1 to 5) may include a dome portion 610 located in a central portion of the diaphragm 600 and an edge portion 620 formed along at least a portion of an edge of the dome portion 610.

The dome portion 610 according to embodiments may have a dome shape located at the center of the diaphragm 600. However, the present disclosure is not limited thereto, and the dome portion 610 may have, for example, a cone shape or a flat plate shape.

The dome portion 610 according to embodiments may be formed of a material having high strength and low weight to move significantly even under a small sound pressure, for example, to transmit high sound. For example, the dome portion 610 may include a structure (e.g., the structure described in FIGS. 1 to 5) and a graphene layer (e.g., the graphene layer described in FIGS. 2 to 5), and further, the dome portion 610 may further include a binder (e.g., the binder described in FIGS. 3 to 5), and the dome portion 610 may further include a coating layer (e.g., the coating layer described in FIGS. 4 to 5).

The edge portion 620 according to embodiments may be formed of a material having low elasticity, for example, to transmit low sound. For example, the edge portion 620 may include a structure and a graphene layer, and furthermore, the edge portion 620 may further include a binder, and the edge portion 620 may further include a coating layer.

That is, according to embodiments, the dome portion 610 and the edge portion 620 may be formed of the same material, and for example, may be formed by a graphene layer with excellent ductility and a structure including a binder.

Accordingly, in the diaphragm 600 according to embodiments, the dome portion 610 and the edge portion 620 do not need to be made of different materials, and the dome portion 610 and the edge portion 620 do not need to be formed separately. That is, the diaphragm 600 according to embodiments may be processed and formed more easily and quickly.

Hereinafter, a sound generating device including a diaphragm according to embodiments will be described.

Figure 7:
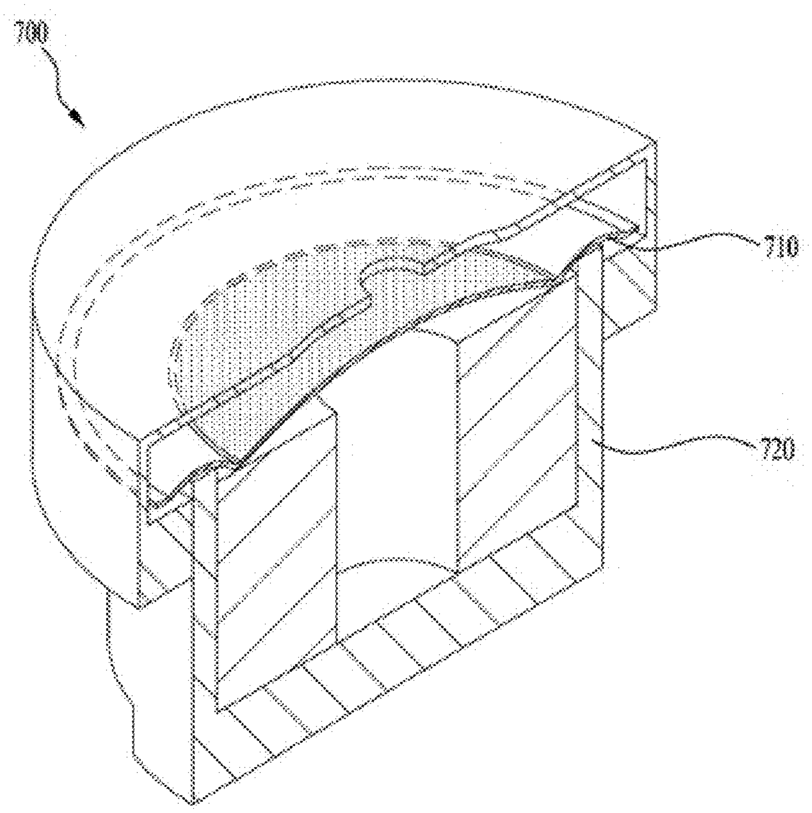
FIG. 7 schematically illustrates a sound generating device according to embodiments.

FIG. 7 schematically illustrates a sound generating device according to embodiments.

A sound generating device 700 according to embodiments may include a vibrating portion 710 (e.g., the diaphragm described in FIGS. 1 to 6) and a driver 720 supporting the vibrating portion 710.

The vibrating portion 710 according to embodiments may include a structure (e.g., the structure described in FIGS. 1 to 6) having a matrix shape, and a graphene layer combined with the structure (e.g., the graphene layer described in FIGS. 2 to 6). The vibrating portion 710 may further include a binder combined with at least a portion of the structure and the graphene layer (e.g., the binder described in FIGS. 3 to 6). The vibrating portion 710 may further include a coating layer formed to cover at least one surface of at least one of the structure and the graphene layer (e.g., the coating layer described in FIGS. 4 to 6).

The driver 720 according to embodiments may be formed to support the vibrating portion 710 and may drive the vibrating portion 710 to vibrate depending on an input current.

The driver 720 according to embodiments may drive the vibrating portion 710 with a winding coil and a permanent magnet. The driver 720 may drive the vibrating portion 710 by displacement proportional to magnetization of balanced armature. The driver 720 may drive the vibrating portion 710 by changing an electric field. In addition, the driver 720 may drive the vibrating portion 710 by generating a magnetic field proportional to the input current. However, a driving method of the driver 720 is not limited thereto, and for example, any method that converts an external signal, including an electrical signal or a magnetic signal, into a voice signal may be applied.

Although not shown, the driver 720 may further include a support that supports the vibrating portion 710.

The support according to embodiments may support an edge portion included in the vibrating portion 710 (e.g., the edge portion described in FIG. 6). In addition, the support may be disposed on an edge portion of an upper surface of the vibrating portion 710 and an edge portion of a lower surface of the vibrating portion 710 and may externally expose the dome portion of the vibrating portion 710 (e.g., the dome portion described in FIG. 6).

The support according to embodiments may be formed of a material to which an electrical or magnetic signal generated within the driver 720 is transmitted. However, the present disclosure is not limited thereto, and the support may also be formed of an insulating material to which an electrical or magnetic signal generated within the driver 720 is not transmitted.

Hereinafter, a method of manufacturing a diaphragm and a sound generating device including the diaphragm according to embodiments will be described.

Figure 8:
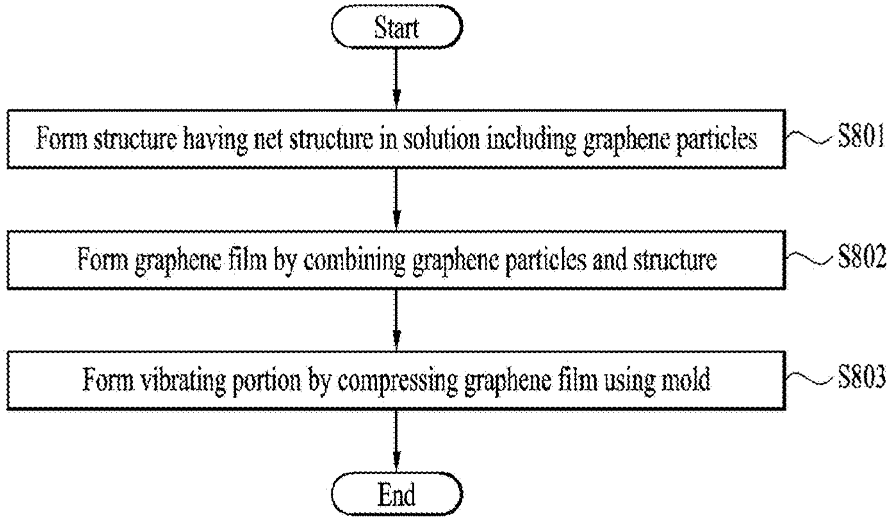
FIG. 8 is a flowchart of a method of manufacturing a sound generating device according to embodiments.

FIG. 8 is a flowchart of a method of manufacturing a sound generating device according to embodiments.

The method of manufacturing a sound generating device according to embodiments (e.g., the sound generating device described in FIG. 7) may include forming a structure having a net structure in a solution including graphene particles (e.g., the structure described in FIGS. 1 to 7) (S801).

In this case, the solution may be water. However, the present disclosure is not limited thereto, and the solvent may be at least one of a polar substance and a non-polar substance, for example, alcohol, isopropyl alcohol, acetone, methanol, acetone, ethanol, isopropyl alcohol (IPA), ethyl acetate (EA), and dimethylformamide (DMF).

The method of manufacturing a sound generating device according to embodiments may include forming a graphene film by combing graphene particles and a structure (S802).

The structure may have a matrix shape. That is, the structure 210 may have one or more through hole (e.g., the void described in FIG. 1 or the through hole described in FIGS. 2 and 5). The graphene particles according to embodiments (e.g., the particles constituting the graphene layer described in FIGS. 2 to 7) may be formed in one or more through holes of the structure. That is, the graphene particles may be formed in the sparse portion of the structure.

The graphene particles may be formed outside the structure. That is, the graphene particles may be formed inside and outside the structure. The structure and the graphene particles may be combined with each other. The structure and the graphene particles may be combined in a mixed state.

Accordingly, the graphene film according to embodiments may be formed in a mixed state in which the structure and the graphene particles are not layered with each other. In other words, the graphene film may be in a state in which the graphene particles are impregnated and combined within the structure such that the structure and the graphene particles are not separated from each other. In other words, the graphene film may be formed by combining the structure with a through hole in a net structure and the graphene particles located in the through hole of the structure and filling all or part of the through hole. In other words, the graphene film may have the graphene particles that are combined with the structure having a matrix shape and fill the same, thereby improving the ductility of the graphene film. Accordingly, the moldability of the graphene film may be improved.

The graphene particles according to embodiments may include a plurality of graphene layers. The graphene particles may include a single graphene laver, but may form multiple graphene layers by being combined with the structure.

The method of manufacturing a sound generating device according to embodiments may include forming a vibrating portion (e.g., the diaphragm described in FIGS. 1 to 6 or the vibrating portion described in FIG. 7) by compressing the graphene film using a mold (S803).

The mold according to embodiments may include at least one of a lower mold and an upper mold. After the graphene film is placed on the mold, the graphene film may be manufactured and molded using pressure or heat. In detail, the graphene film may be placed on at least one of an upper surface of the lower mold or a lower surface of the upper mold, and then the graphene film may be compressed by applying heat or pressure.

The mold according to embodiments may have a certain shape. For example, the mold may have a flat shape, a cone shape, or a dome shape, but is not limited thereto, and may be formed or manufactured to have a shape of the diaphragm to be molded.

According to embodiments, the compressed graphene film may be molded or formed into a vibrating portion in a completed state at room temperature or high temperature.

Hereinafter, the method of manufacturing a sound generating device according to embodiments will be described in detail using a schematic diagram.

Figure 9:
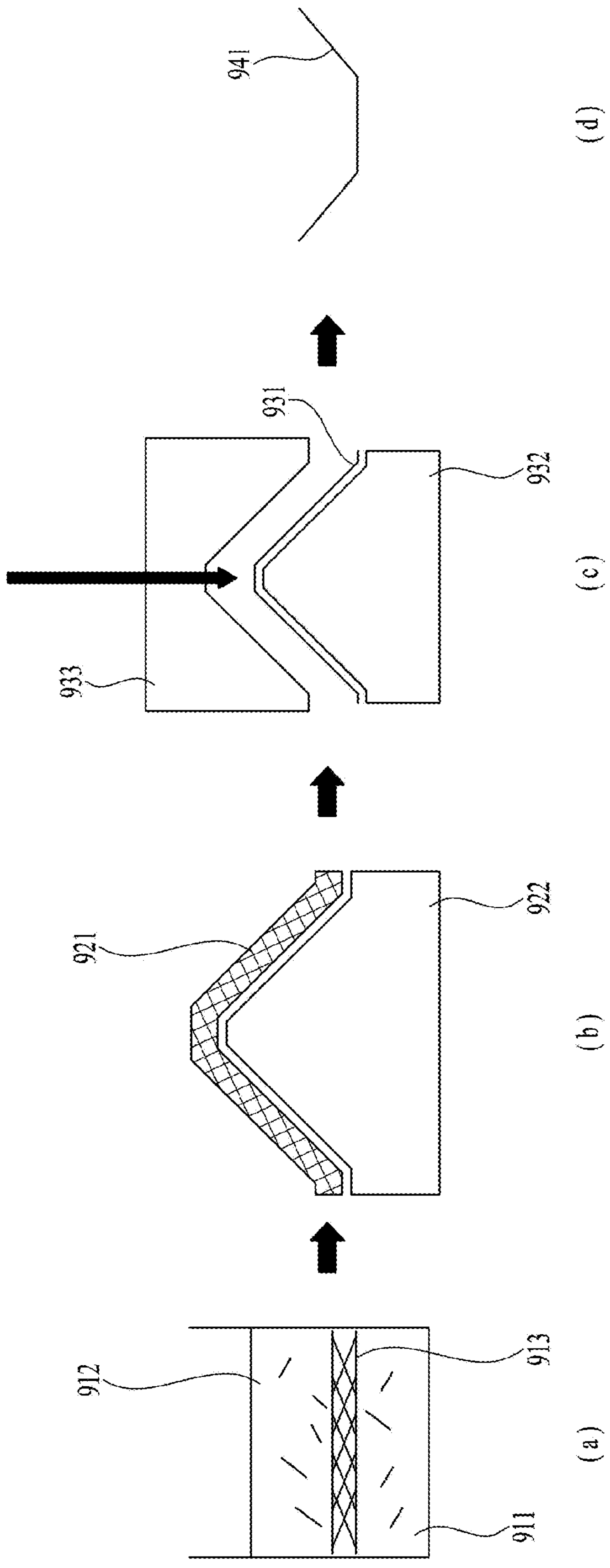
FIG. 9 is a schematic flowchart of a method of manufacturing a sound generating device according to embodiments.

FIG. 9 is a schematic flowchart of a method of manufacturing a sound generating device according to embodiments.

(a) of FIG. 9 shows an operation of forming a graphene film according to embodiments, and corresponds to S801 and S802 described in FIG. 8.

As shown in (a) of FIG. 9, a structure 913 (e.g., the structure described in FIGS. 1 to 8) having a net structure may be formed in a solution 911 including graphene particles 912 according to embodiments. That is, the solution 911 may be a solution containing the graphene particles 912 (e.g., the graphene particles used in the graphene layer described in FIGS. 2 to 8) as a solute. The solution 911 may contain water as a solvent, but is not limited thereto. The solution 911 may further include a material used as a binder (the binder described in FIGS. 3 to 7) as a solute. The solution 911 may further include a material used in a coating layer (e.g., the coating layer described in FIGS. 4 to 7) as a solute.

The structure 913 having a net structure may be placed in the solution 911 according to embodiments at room temperature, and thus the graphene particles 912 may be combined inside and outside the net structure. That is, the structure 913 and the graphene particles 912 may be mixed and combined within the solution 911 to form a graphene film (e.g., the graphene film described in FIG. 8).

In (a) of FIG. 9, a method of forming a graphene film through a solution is used, but the present disclosure is not limited thereto. For example, the graphene film may be formed by adding a material of the coating layer or a material of a binder to graphene powder.

(b) of FIG. 9 shows an operation of molding a graphene film according to embodiments and corresponds to S803 described in FIG. 8.

As shown in (b) of FIG. 9, a graphene film 921 according to embodiments may be placed on a mold, for example, a lower mold 922 to mold the graphene film 921. In this case, the lower mold 922 may be in a state in which a material used in the coating layer is coated on at least a portion of one surface of the lower mold 922. As such, the graphene film 921 may be molded into a desired shape.

(c) of FIG. 9 shows an operation of molding a graphene film according to embodiments and corresponds to S803 described in FIG. 8.

As shown in (c) of FIG. 9, a graphene film 931 according to embodiments may be disposed between a lower mold 932 and an upper mold 933. In this case, a material used in the coating layer may be coated on at least a portion of one surface of the lower mold 932 and the upper mold 933.

That is, as shown in (b) to (c) of FIG. 9, a material used in the coating layer may be coated on the mold (e.g., an upper mold or a lower mold), and the coating layer may be made of, for example, a material used in the coating layer.

(b) to (c) of FIG. 9 illustrates an operation of molding the graphene film using a compression method, but the present disclosure is not limited thereto.

The graphene film according to embodiments may be molded using, for example, a filter method, and in detail, a diaphragm may be generated using a micro- or nano-sized filter. In this case, a desired diaphragm shape may be manufactured using a filter without a separate molding process.

The graphene film according to embodiments may be molded using, for example, a coating method. In this case, the graphene film with high quality may be formed.

The graphene film according to embodiments may be molded using, for example, an impregnation method. In this case, the physical properties of the graphene film may be controlled depending on the characteristics of the structure.

(d) of FIG. 9 illustrates a diaphragm formed according to embodiments.

As shown in (d) of FIG. 9, a diaphragm 941 may be manufactured using the graphene film having a molded shape. In this case, the diaphragm 941 may include not only a structure and a graphene film including graphene particles, but also a binder and a coating layer.

However, the present disclosure is not limited thereto, and the molding and forming operations of the diaphragm 941 may be separated. For example, after the diaphragm 941 is formed by a coating method, the diaphragm 941 may be molded into a desired shape.

A diaphragm and a sound generating device including the diaphragm according to embodiments may have a high Young's modulus and low density, and thus a reproduction band may be extended to low or high sounds.

A diaphragm and a sound generating device including the diaphragm according to embodiments may have a high internal loss to improve response characteristics with a flat frequency.

A diaphragm and a sound generating device including the diaphragm according to embodiments may have improved ductility to have excellent moldability.

Terms such as first and second used in this specification may be used to describe various components according to embodiments. However, various components according to embodiments do not need to be limited by the above terms. These terms are merely used to distinguish one component from another component. For example, a first learning model may be referred to as a second learning model, and similarly, a second learning model may be referred to as a first learning model, and such changes need to be construed as not departing from the scope of the various embodiments described above. Although both the first learning model and the second learning model are learning models, they are not construed as the same virtual object unless clearly indicated in the context.

In the specification, "/" and "," may be construed as indicating "and/or". For example, "A/B" may mean "A and/or B". Furthermore, "A, B" may mean "A and/or B". Furthermore, "A/B/C" may mean "at least one of A, B and/or C".

In the specification, "or" may be construed as "and/or". For example, "A or B" may include 1) only A, 2) only B, and/or 3) both A and B. In other words, in the specification, "or" may be construed as indicating "additionally or alternatively".

In other words, although this specification has been described with reference to the attached drawings, these are only examples and are not limited to specific embodiments, and various modifications may be made by a person skilled in the art in the art to which the present disclosure pertains and may also fall within the scope of the claims. Additionally, such modifications do not need to be understood separately from the technical spirit of the present disclosure.

In addition, although exemplary embodiments have been shown and described above, the present disclosure is not limited to the specific embodiments described above, and various modifications may be made by a person skilled in the art in the art to which the present disclosure pertains without departing from the spirit of the present disclosure as claimed in the claims, and the modifications do not need to be understood separately from the technical spirit or perspective of the present disclosure.

In addition, throughout this specification, both device and method present disclosures have been described. As necessary, the description of the device and method present disclosures may be applied supplementarily.

It is understood by a person skilled in the art that various changes and modifications may be made in the present disclosure without departing from the spirit or scope of the present disclosure. Accordingly, the present disclosure is intended to cover modifications and variations of the present disclosure provided within the scope of the appended claims and their equivalents.

Both device and method present disclosures are mentioned in this specification and descriptions of both of the device and method present disclosures may be complementarily applicable to each other.

The invention claimed is:

1. A diaphragm comprising:

a structure including a first material formed in a matrix shape including a plurality of through holes; and a graphene layer combined with the structure to be located in at least one of the plurality of through holes to fill the at least a portion of the through holes.

2. The diaphragm of claim 1, further comprising:

a binder including a second material for promoting combining the structure and the graphene layer together.

3. The diaphragm of claim 2, wherein the first material is identical to the second material.

4. The diaphragm of claim 2, wherein the binder is 5 to 20 percent by weight of the diaphragm.

5. The diaphragm of claim 1, further comprising:

a coating layer formed on at least one surface of the structure and configured to protect the diaphragm.

6. The diaphragm of claim 1, wherein the graphene layer includes a plurality of graphene layers which are stacked.

7. The diaphragm of claim 1, wherein:

the diaphragm includes a dome portion disposed at a central portion of the diaphragm and an edge portion forming an edge of the dome portion; and the dome portion and the edge portion include the structure and the graphene layer.

8. The diaphragm of claim 1, wherein the first material is at least one of graphene, cellulose, nacre, bone, dention, polyacryl acid (PAA), polycyclic aromatic hydrocarbon (PAH), glutaraldehyde (GA), borate, polyvinyl alcohol (PVA), or PCDO.

9. The diaphragm of claim 2, wherein the second material is at least one of cellulose, nacre, bone, dention, PAA, PAH, GA, borate, PVA, or PCDO.

10. The diaphragm of claim 5, wherein the coating layer is at least one polymer compound including cellulose or PVA.

11. A sound generating device comprising:

a vibrating portion; and a driver configured to support the vibrating portion and cause the vibrating portion to vibrate, wherein the vibrating portion comprises:

a structure formed in a matrix shape including a plurality of through holes, and a graphene layer combined with the structure to be located in at least one of the plurality of through holes to fill the at least a portion of the through holes.

12. A method of manufacturing a sound generating device, the method comprising:

forming a structure having a structure formed in a matrix shape including a plurality of through holes and comprised of a first material in a first solution including graphene particles;

forming a graphene film by combining the graphene particles with the structure to be located in at least one of the plurality of through holes to fill the at least a portion of the through holes; and compressing the graphene film to form a shape using a mold.

13. The method of claim 12, wherein the first solution further includes a binder including a second material for promoting combining the graphene particles and the structure.

14. The method of claim 12, wherein the mold is coated with the first solution.

15. The method of claim 13, wherein the binder is 5 to 20 percent by weight of the graphene film.

* * * * *